Sept. 8, 1970      P. H. DAWSON ET AL      3,527,939
THREE-DIMENSIONAL QUADRUPOLE MASS SPECTROMETER AND GAUGE
Filed Aug. 29, 1968      4 Sheets-Sheet 1
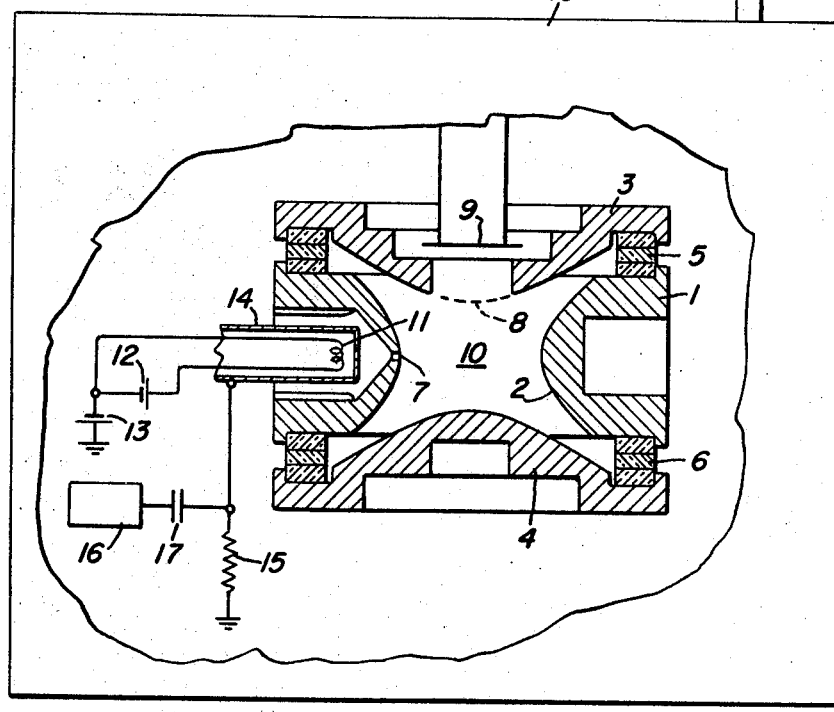
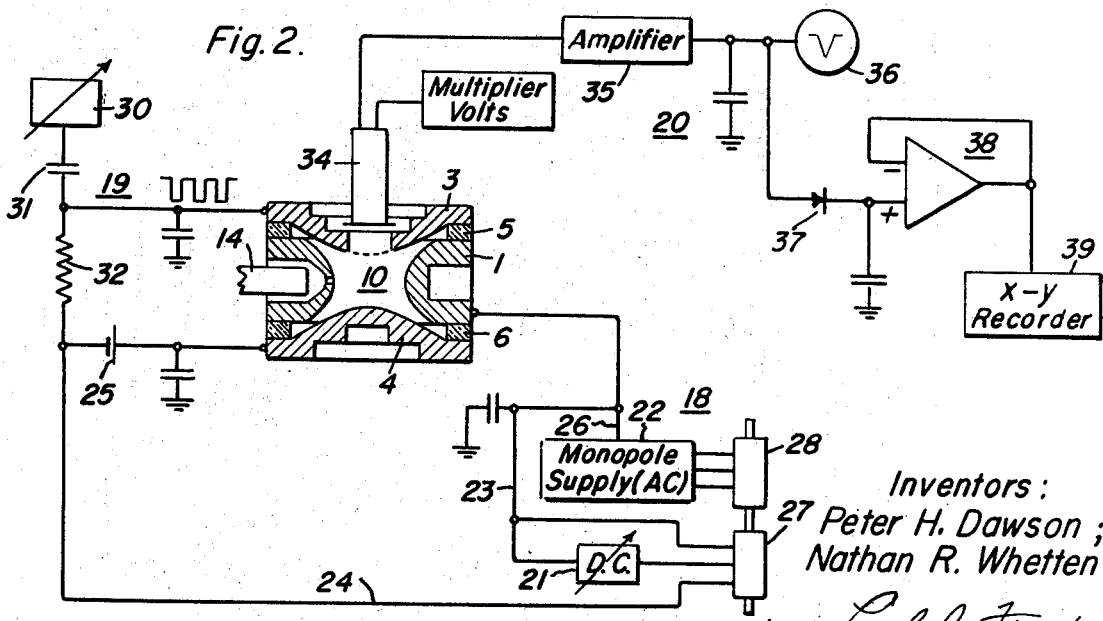
Inventors:
Peter H. Dawson;
Nathan R. Whetten
by Paul A. Frank
Their Attorney.

Inventors:
Peter H. Dawson,
Nathan R. Whetten,
by Paul A. Frank
Their Attorney.

United States Patent Office 3,527,939
Patented Sept. 8, 1970

3,527,939
THREE-DIMENSIONAL QUADRUPOLE MASS SPECTROMETER AND GAUGE
Peter H. Dawson, Schenectady, and Nathan R. Whetten, Burnt Hills, N.Y., assignors to General Electric Company, a corporation of New York
Continuation-in-part of application Ser. No. 626,207, Mar. 27, 1967. This application Aug. 29, 1968, Ser. No. 767,599
Int. Cl. H01j 39/34
U.S. Cl. 250—41.9                    14 Claims

ABSTRACT OF THE DISCLOSURE

A mass spectrometer and ion gauge employs opposed electrodes to form a containment region in which superimposed variable high frequency and direct current potentials on the electrodes establish a rotationally symmetric hyperbolic electric field so that ions of a given or selected $e/m$, depending on the values and frequency of the potentials, are trapped and stored for a controllable time period. Periodic voltage pulses applied to the electrodes sweep trapped ions through an aperture in one electrode to an electron multiplier and measuring circuits. By varying the intensities and frequencies of the potentials ions of differing mass can be separated and measured.

---

The present invention relates to methods and apparatus for analyzing gases and in particular to methods and apparatus for determining the pressure and proportions of the constituent gases in a low pressure atmosphere. This application is a continuation-in-part of applicants' prior application Ser. No. 626,207, filed Mar. 27, 1967, now abandoned, and assigned to the assignee of this invention.

The mass spectrometer is a well-known instrument for measuring the pressure of and determining constituent gases in an atmosphere by ionizing the gas molecules and measuring the mass-to-charge ratio of the ions. One such type of instrument shown in U.S. Pat. 2,939,952, granted June 7, 1960, to W. Paul and H. Steinwedel, employs a cylindrically symmetrical high-frequency quadrupole field to select ions of a given mass. In this system, ions of a given mass perform stable oscillations around the axis of symmetry of the field and pass to a measuring device, while those of a different mass are deflected by the fields to impinge on the electrodes and are thus removed. In this way, the measuring device gives a continuous direct current measurement of the stable ions flowing through the mass spectrometer. By varying the amplitude or frequency of the field, ions having different mass-to-charge ratios can be separated and measured so that the constituents of an atmosphere can be determined. This patent also describes a rotationally symmetric quadrupole field in which ions in stable oscillations are continuously measured by the inductive loading on the high frequency circuit.

One of the limitations of such existing mass spectrometers is that, because they give a continuous measurement, there is a lower limit when the signal becomes less than the noise beyond which they are unable to measure pressures. A second limitation of existing mass spectrometers is that the resolution is limited in part by the path length of the ions in the spectrometer and, therefore, by the physical size of the instrument.

In another type of mass spectrometer such as that shown for example in U.S. Pat. 2,764,691, granted Sept. 25, 1956, to J. A. Hipple, Jr., ions of varying masses are created in a field free region so that they are at rest or have negligible motion. A voltage pulse is thereafter applied for a short time to impart equal momenta to the ions, the pulse being terminated before ions leave the region through a perforated electrode. One of the limitations of this type of mass spectrometer is that there is no selection according to mass until after the ions leave the field free region making measurement of ions of a given mass more difficult and requiring complex selective measuring apparatus.

Accordingly, it would be desirable, in order to obtain both high sensitivity and high resolution in a mass spectrometer to be able to store ions of a selected mass-to-charge ratio for a long period of time, giving them a very long path length in a small instrument, while removing or rejecting all ions of a different mass-to-charge ratio and after a given time interval measure the number of stored ions.

It is a primary object of our invention to provide a new and improved mass spectrometer in which ions of a selected mass-to-charge ratio may be stored for a period of time and then measured.

It is another object of our invention to provide a new and improved mass spectrometer which permits the measurement of ions over a wide range of mass-to-charge ratios.

It is still another object of our invention to provide a new and improved mass spectrometer which avoids non-linear resonances of the ions in a storage region caused by any distortions in the fields establishing the storage region.

It is another object of our invention to provide a new and improved pressure gauge capable of measuring extremely low pressures.

It is a further object of our invention to provide a leak detector capable of collecting and measuring the number of gas molecules leaking into a given confined volume over a long period of time to determine the rate of leakage.

Briefly, in accordance with one embodiment of our invention, a rotationally symmetric three-dimensional time varying electric field is established by superimposing high-frequency and direct-current potentials on opposed electrodes and varying the strentgh or frequency of the fields so that particles of a selected charge-to-mass ratio may be conatined. The particles, or ions, are continuously generated and stored and are periodically moved out of the trapping field into a measurement circuit. An important feature of the arrangement is that the storage time and, therefore, the sensitivity, may be increased as the total pressure being measured decreases.

Our invention also permits operation of the device as an ion gauge by trapping all ions within a broad range of mass-to-charge ratio while eliminating any spurious or background readings caused by soft X-rays or ions electrically desorbed from electrode surfaces.

Another feature of our invention is the use in a mass spectrometer having opposed electrodes for establishing an ion storage space, of an electrode having apertures so that by applying a pulse to the electric fields between the electrodes, stored ions may periodically be swept out of the trapping region to a measurement circuit.

Still another feature of our mass spectrometer is the employment of a variable bias voltage between certain electrodes used to establish a containment region for ions to eliminate non-linear resonance effects in stored ions that might be caused by distortions in the field establishing the region.

The invention will be more clearly understood from the following description when taken in connection with the drawings in which FIG. 1 is a cross-sectional drawing of apparatus embodying our invention;

FIG. 2 is a circuit diagram employed with the apparatus of FIG. 1;

Figure 3:
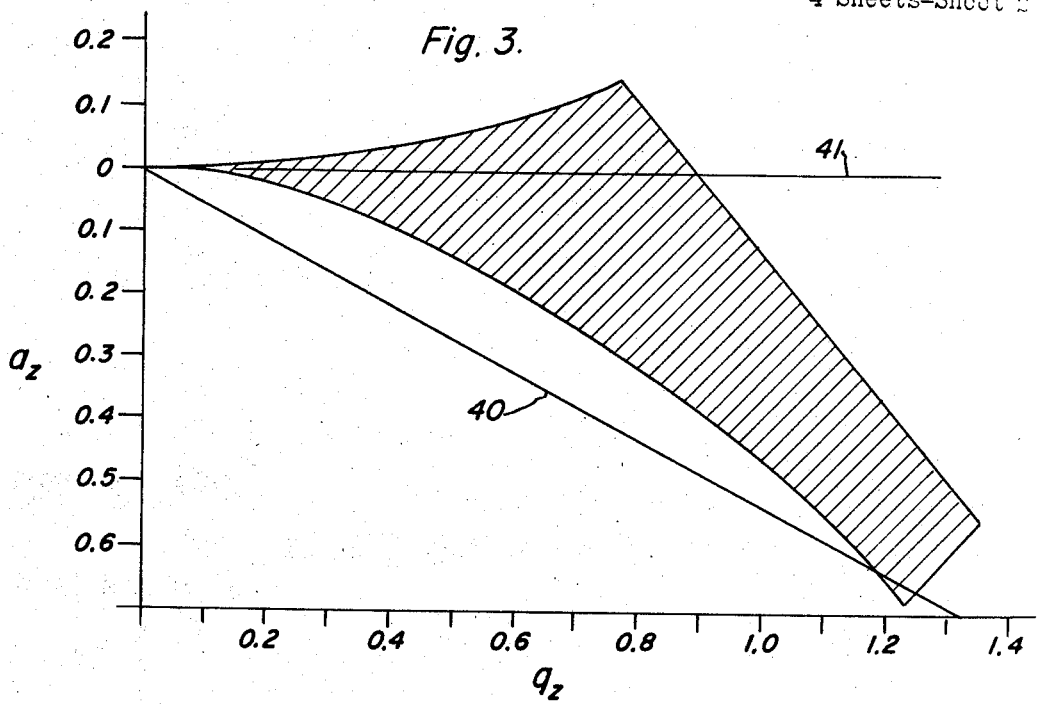
FIG. 3 is a diagram demonstrating certain operational characteristics of our invention.

In the drawing, FIG. 1 illustrates a mass spectrometer comprising a ring electrode 1 whose central surface 2 may be formed, for example, by rotation of a half of a hyperbola about a vertical axis. Positioned at right angles to ring electrode 1 are a pair of electrodes 3, 4 whose inner surfaces likewise may be hyperboloid in shape. The electrodes are, of course, to be arranged in a conventional enclosure 45 which can be evacuated and which is connected by a conduit 47 to an atmosphere or body 46 whose pressure or constituent gases are to be measured. An insulating gasket 5 is positioned between flanges attached to electrodes 1 and 3 and a similar insulating gasket 6 is positioned between corresponding flanges of electrodes 1 and 4. Ring electrode 1 is provided with an aperture 7 which permits the admission of gases to be measured into the containment region defined by the electrodes 1, 3 and 4 as well as admission of an electron beam for ionizing gases within this region. Electrode 3 is provided with a centrally positioned set of apertures or screen 8 through which ions, after being trapped within the confined region are passed or swept to an ion-collecting electrode 9 located on the outside of the containment region 10 defined by the opposed electrodes.

In order to ionize gases within region 10 we provide an electron gun which comprises a filament or heater 11 supplied with heating current from a suitable source such as battery 12. Filament 11 is maintained at a negative potential by means of a biasing voltage supplied by any conventional means such as battery 13. The electron gun also includes an accelerating electrode 14 which is maintained at ground potential by connection to ground through resistor 15 and to which a negative pulse may be applied, for purposes to be described later, from a pulser 16 through a capacitor 17.

The electrical circuit employed with the mass spectrometer of FIG. 1 is illustrated in FIG. 2 and comprises a voltage supply circuit 18, a pulse-out circuit 19, and a measurement circuit 20.

The voltage supply circuit 18 which provides operating potentials to electrodes 1, 3 and 4, includes a variable voltage direct-current supply 21 and a high-frequency supply circuit 22 whose potential and frequency both may be varied. A positive unidirectional potential is supplied to ring electrode 1 from direct-current supply 21 by means of lead 23. Electrodes 3 and 4 are maintained at a negative unidirectional potential with respect to ring electrode 1 by means of lead 24. Electrode 4 can be maintained slightly positive or negative with respect to electrode 3 by means of a biasing battery 25. A time-varying potential is supplied to ring electrode 1 from supply 22 by means of lead 26. A pair of ganged potentiometers 27, 28 are connected respectively in the circuits of the unidirectional power supply 21 and of the high-frequency power supply 22. Preferably, the ratio of the resistance of potentiometers 27, 28 is such that as these respective resistances are varied, the ratio of the unidirectional voltage to the high-frequency voltage remains constant. The values of the voltages of power supply 21 and power supply 22 will depend on the geometry of the particular mass spectrometer. The frequency of power supply 22 may be in the range of $10^4$ to $10^7$ hertz.

We provide a pulse-out circuit 19 to periodically apply a negative pulse of short duration to electrode 3. Pulse-out circuit 19 comprises a variable pulser 30 which is connected to electrode 3 through a capacitor 31 and to electrode 4 through a high resistance 32 to keep the pulse of negative voltage supplied by pulser 30 from being applied to electrode 4.

The detection and measurement circuit 20 comprises a conventional electron multiplier 34 which is connected through an amplifier 35 to an oscilloscope 36. The output of amplifier 35 is likewise supplied through a diode 37 and an operational amplifier 38 to a recorder 39.

In the operation of our mass spectrometer, a unidirectional potential is maintained between ring electrode 1 and electrodes 3 and 4 and a high-frequency voltage is applied to ring electrode 1. When the mass spectrometer is connected to an atmosphere whose constituent gases and their proportions are to be measured, gases entering the containment region 10 are ionized by electrons introduced into region 10 by the electron gun. Operating potentials are applied to electrodes 1, 3 and 4 to establish a rotationally symmetric, three-dimensional time-varying electric field in containment region 10. Under the influence of this field, ions having a particular charge-to-mass ratio become resonant and oscillate, depending upon the values and frequency of the voltages applied to the electrodes, and thus are contained within the region so that they do not strike the electrodes. At the same time ions of a different charge-to-mass ratio are not in a stable trajectory and will strike and be removed by the field generating electrodes. In this way our apparatus operates to sort the ions dynamically according to their mass. Periodically, a negative pulse with a repetition rate varying with the pressure of the gas in region 10 is applied to the perforated electrode 3 to distort the positive ion trajectory and the positive ions are drawn toward electrode 3 and passed through apertures 8 to collecting anode 9 which may be the first dynode of an electron multiplier 34. In this manner, a signal is provided to the electron multiplier output that is proportional to the number of ions stored in containment region 10. Shortly before the sweep-out pulse is applied to electrode 3, a negative pulse is applied to the electron gun from pulser 16 to cut off the electrons entering the containment region. By varying potentiometers 27, 28 to vary the voltages applied to the electrodes 1, 3 and 4, measurement of ions having different $e/m$ ratios can be made. In this fashion, our instrument permits both quantitative and qualitative measurements of the gases within region 10.

Certain features and advantages of our improved mass spectrometer and ion gauge will become more apparent from a consideration of the stability diagram of FIG. 3. The motion of a charged particle in the rotationally symmetric, three-dimensional quadrupole field present in containment region 10 is governed by the Mathieu equation $$(2/\Omega)^2 d^2Z/dt^2 + (a_z - 2q_z \cos \Omega t)z = 0$$

In this equation Z is the distance of the ion from the central plane between electrodes 3, 4 and $\Omega$ is the angular frequency of the applied high-frequency voltage. Similar equations may be written for the motion in the X–Y plane. $a_z$ and $q_z$ are constants of the Mathieu equation and are given by $$a_z = -2a_r = 8\left(\frac{e}{m}\right)\left(\frac{V_{dc}}{Z_0^2}\right) 1/\Omega^2$$

and $$q_z = -2q_r = 4\left(\frac{e}{m}\right)\left(\frac{V_{ac}}{Z_0^2}\right) 1/\Omega^2$$

In these equations $Z_0$ is the minimum distance from the electrodes 3, 4 to the center of the device along the Z axis. In FIG. 3 the coordinates are the values of $a$ and $q$ and those values of these variables within the shaded stability region give stable, bounded trajectories of the ions. In operating our device as a mass spectrometer, the $a/q$ ratio is chosen so as to cut an edge of the stability region as is indicated by line 40 of FIG. 3. By so doing, only ions having a given charge-to-mass ratio are stable for a given high-frequency voltage and frequency. By varying either the high-frequency voltage or the frequency, ions of other masses come into stable orbits one at a time and the constituents of a given atmosphere can be determined qualitatively and quantitatively.

Our apparatus is also operable as an ion gauge. For such operation an $a/q$ ratio is chosen that cuts across a broad area of the stability diagram of FIG. 3. For example, in this figure the line 41 indicates a value of $a=0$ corresponding to a zero applied direct current voltage to electrodes 3 and 4. Of course, any other desired voltage may be used and a different cutting line obtained. Under such conditions a wide range of ions of differing $e/m$ ratio are in stable orbits. In operating our apparatus as an ion gauge, we have measured pressures as low as $3 \times 10^{-12}$ torr. For such measurements electrodes 3, 4 were maintained at ground potential, corresponding to the line $a=0$ on the $a/q$ stability diagram of FIG. 3. Under such conditions, ions with a wide range of $e/m$ were simultaneously trapped in the device.

An important advantage of our apparatus for either mode of operation is its feature of storing ions for a long, controllable period of time. Thus we obtain a large ion path length in a very small compact instrument. The gas in the containment region can be ionized over a long period of time and the ions can be pulsed out as desired. In this manner the storage feature of our apparatus permits integrating the ion current without the noise inherent in electronic integration. This storage feature makes it possible to measure extremely small partial pressures when operating as a mass spectrometer and when operating as an ion gauge, extremely low total pressures. Our analyzer has the particular advantage that sensitivity increases as the pressure decreases since the ions can be integrated for longer periods at lower pressures. Collision with neutral gas atoms which sometimes put an ion in an unstable trajectory and thereby remove it from the trap are less frequent at lower pressures. Our improved technique of using a pulse to draw out or remove trapped ions permits storing ions until a large number have been trapped and then removing them for measurement purposes. Thus, if a very low pressure is being measured, the storage time is increased until a sufficient number of ions have been trapped so that a measurement can easily be made. For example, the spacing of the sweep-out pulse can be varied from microseconds to hours. The pulse output signal obtained is converted to a direct signal suitable for recording by using a peak reading amplifier.

The device described in FIGS. 1 and 2 has been operated as a partial pressure analyzer with resolution of 300, the term "resolution" being defined conventionally as $M/\Delta M$, where $\Delta M$ is the width of a peak at half maximum amplitude. This value of resolution is in no way a limit to the resolution as the $a/q$ ratio (line 40 of FIG. 3) can be selected to cut the stability region very close to the edge thereby gaining in resolution at the expense of sensitivity. For any value selected, the resolution obtainable depends on the number of high-frequency oscillations the ions undergo, and therefore, the containment time. By so choosing the $a/q$ ratio, ions can be stored for a long time so that ions whose $e/m$ ratio is close to but not exactly equal to the ratio being trapped strike the edge of the device. At the end of a long containment time the remaining ions are pulsed out of the trap to the collecting electrode. Thus, by storing the ions, our apparatus permits obtaining a high resolution. This integrated pulse concept obviously is most valuable at low pressure measurements.

Another advantage of our apparatus is that by switching off the electron beam which forms the ions in the containment region before the ions are swept to the collecting electrode, undesired species being continuously formed are removed by striking the electrodes. Also, metastable ions, excited neutrals, and soft X-rays are removed in a similar manner. And, of course, the long containment time after the electron beam is switched off permits greater resolution. In operating our apparatus, we have found that the lowest limit on pressure measurements depends only on how low a vacuum can be created and maintained. Our pulse draw-out detection technique permits waiting until a large number of ions are trapped, after which they are removed an measured. If the pressure is very low, the waiting time is merely increased until a sufficient number of ions have been trapped so that a measurement can easily be made. The pulse output signal thus obtained is reconverted to a direct current signal suitable for an X–Y strip recorder by using a peak reading amplifier. Use of an electron multiplier provides a further gain to achieve this result.

Figure 4:
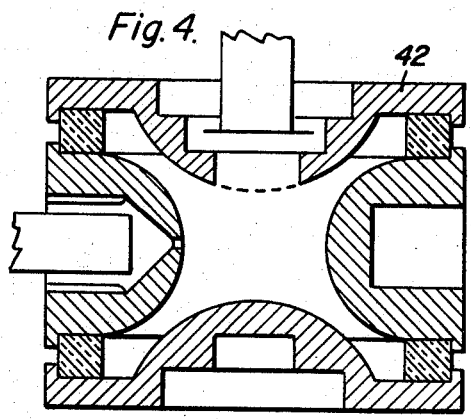
FIG. 4 is a cross-sectional drawing of a modification of apparatus embodying our invention.

In FIG. 4 we have shown a modification of our apparatus in which the electrodes rather than having hyperbolic surfaces are hemispherical in shape. Furthermore, it is apparent that while solid electrodes are shown, these may be formed of mesh. Thus, while electrode 42 is shown as having a central portion formed of a wire mesh, the entire electrode may be formed of such mesh. Likewise, the other electrodes may be formed of a similar material. As a matter of fact, we prefer to employ a large number of small perforations in the electrodes through which ions are withdrawn since small holes do not distort the fields inside the device to the degree that a single large hole produces distortion.

Figure 5:
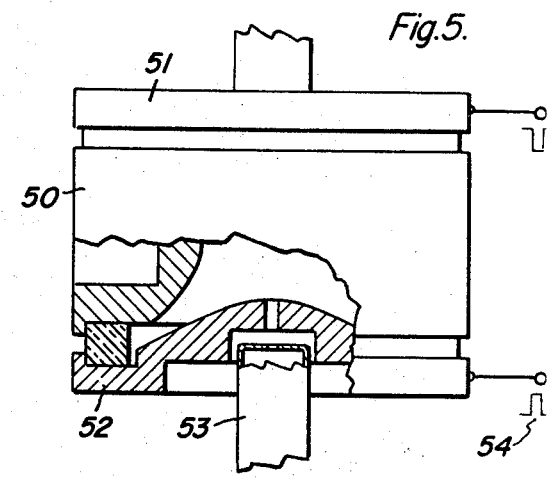
FIG. 5 illustrates a modified electrode of our invention.

In the modification of our apparatus illustrated in FIG. 5, the ring electrode 50 is imperforate, while the two opposed electrodes 51 and 52 have centrally-positioned apertures. The aperture in electrode 51 preferably, for the reasons previously given, is mesh in form, while electrode 52 is provided with a central aperture for admission of ions from a conventional ion source 53, which may be, for example, a plasma discharge, an ionization chamber, a surface ionization electrode, or the like. Of course, the ions for the containment region need not be admitted through an electrode but may be admitted through any other aperture located as desired.

Another feature of the apparatus shown in FIG. 5 is the providing of a positive pulse 54 of voltage to electrode 52 to remove negative ions to appropriate measurement circuits (not shown). In this manner, the electrode 52 operates to remove negative ions just as the electrode 51 operates to remove and measure positive ions.

In the operation of the apparatus of FIG. 5, the potential of electrode 52 is pulsed negatively permitting positive ions from the ion source 53 to reach the containment region 10. Electrode 52 is then returned to its normal potential, and the mass selection and withdrawal of ions is performed in the same manner as in connection with the apparatus of FIG. 1. By using the ion source 53 we thus permit introducing ions into the containment region from a conventional source in a sudden burst, which operation can be repeated after each draw-out pulse.

Figure 6:
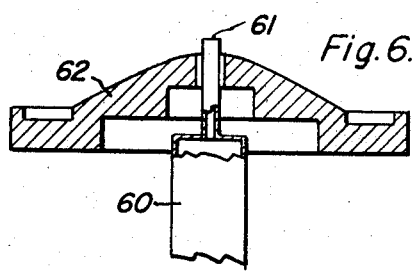

In the apparatus of FIG. 6, in a manner similar to that of the apparatus of FIG. 5, we provide ions from a conventional ion source, such, again, as from a plasma discharge, ionization chamber, or a surface ionization electrode, for example. In the apparatus of FIG. 6, the ions from such source emerge into the containment region through a small snout 61 which is electrically insulated from electrode 62. Preferably, snout 61 does not protrude very far into the containment region 10 in order that the fields within this region are not disturbed. In operating a device of this type, we control the energy of the entering ions so that they reach the center of the containment region for some portion of the high-frequency cycle and have very little kinetic energy at the center. This technique permits us to provide continuous entry of ions into the containment region, rather than the pulsed injection provided by the apparatus of FIG. 5.

Figure 7:
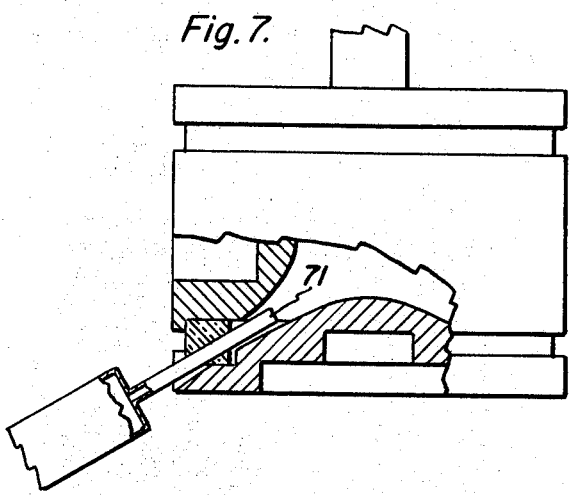
FIGS. 6 and 7 illustrate alternative ion injection apparatus.

The apparatus of FIG. 7 shows an arrangement similar to that of FIG. 6 in which snout 71, similar to the snout 61 of the apparatus of FIG. 6, enters the containment region diagonally to the center line of the electrodes. In all other respects, the apparatus of FIG. 7 is similar to that of FIG. 6.

The apparatus of our invention may also be operated as a leak detector, for example, for detecting a probe gas used with a system, helium being a conventional probe gas used for such purposes. Thus, a probe gas may be applied around the body 46 in FIG. 1. For such use, fixed potentials, both direct-current and high-frequency, are supplied to the respective electrodes and a sweep-out pulse of a predetermined time occurrence is supplied to electrode 3. A suitable warning device or indicator (not shown) signals a leak in body 46.

Figure 8:
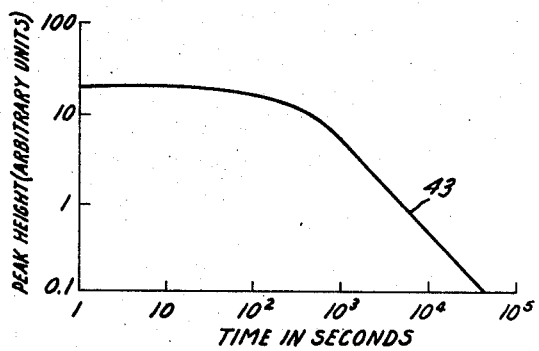
FIG. 8 is a curve illustrating certain operational characteristics of our mass spectrometer.

Certain characteristics of the mass spectrometer of FIG. 2 are shown in the graph of FIG. 8. In operating the apparatus of FIG. 2 to obtain curve 43, the ion storage feature of the mass spectrometer was demonstrated by ionizing the residual gas in region 10 for a fixed time, i.e., ten seconds then disconnecting the electron-emitting filament 11 and determining the presence of ions in the trap region after long intervals of time. The unidirectional voltage 21 was set at ground potential corresponding to $a=0$ and $q$ was set at 0.7 for mass 28 so that all ions in a broad stable region were trapped. A drawout pulse was applied to cap electrode 3 after varying intervals of time, and the corresponding electron multiplier output pulse was recorded. FIG. 8 presents a decay curve on a log-log plot obtained for a total background pressure of $3 \times 10^{-10}$ torr. The storage feature was found to permit trapping of ions for periods as long as several days. The decay curve is a straight line with a slope of approximate unity for times greater than $10^3$ seconds. The curve is flatter for shorter times. This behavior is consistent with the hypothesis that the loss mechanism is dominated by ion-ion scattering.

An interesting feature of the low resolution ion gauge mode of storage is that a small drawout pulse (20 volts, 2 to 5 microseconds) can be applied to the drawout cap electrode 3 to sample the stored ions. Only a fraction of the stored ions is removed by this sampling technique and the process can be repeated several times before all of the ions are lost.

A voltage pulse on the drawout cap electrode 3 of 100 to 150 volts with a duration of several high-frequency cycles is usually necessary in order to remove all of the ions from the trap when operating in the ion gauge mode. However, when operating in a higher resolution mode, smaller voltage pulses of the order of 20 to 100 volts of shorter duration usually are sufficient to remove the ions.

Figure 9:
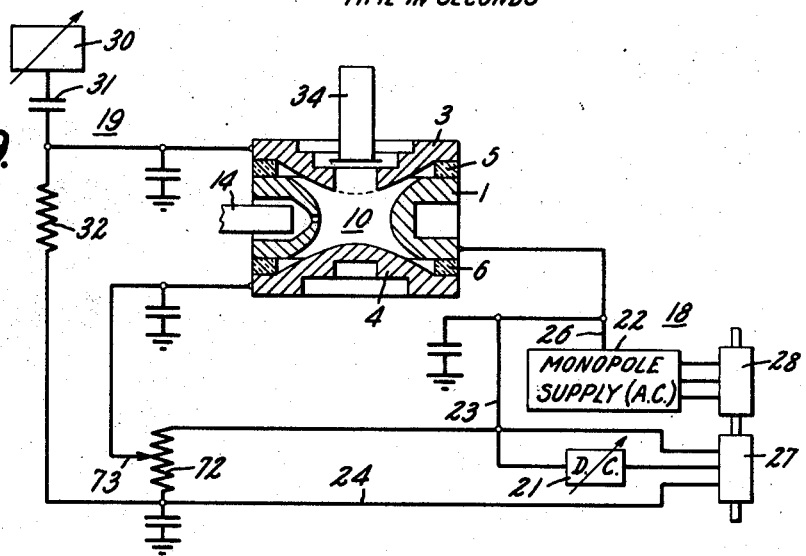
FIG. 9 is a modification of the apparatus of FIG. 2.

The apparatus of FIG. 9 illustrates a modification of the mass spectrometer, or ion storage gauge, which is useful when long ion storage times are employed. Under such conditions, as a direct consequence of the times the ions spend in the field, the ions are very susceptible to non-linear resonance effects due to small distortions in the field. These distortions may be due to mechanical misadjustment of the electrodes, departure from perfect hyperboloid shape, sub-harmonics in the radio frequency voltage, or the potential well created by the ionizing electron beam. The problem of nonlinear resonances increases as the storage time is increased and may be especially noticeable at extremely low pressures when longer storage times are used. In the apparatus of FIG. 9, we employ a variable bias voltage between endcaps 3, 4 which voltage is a predetermined percentage of the direct current voltage from supply 21. In order to impress this variable voltage between electrodes 3 and 4, a potentiometer 72 is connected between voltage supply 21 and ground, and a variable tap 73 is connected to electrode 4, electrode 3 being connected through resistance 32 to the grounded end of the potentiometer.

Figure 10:
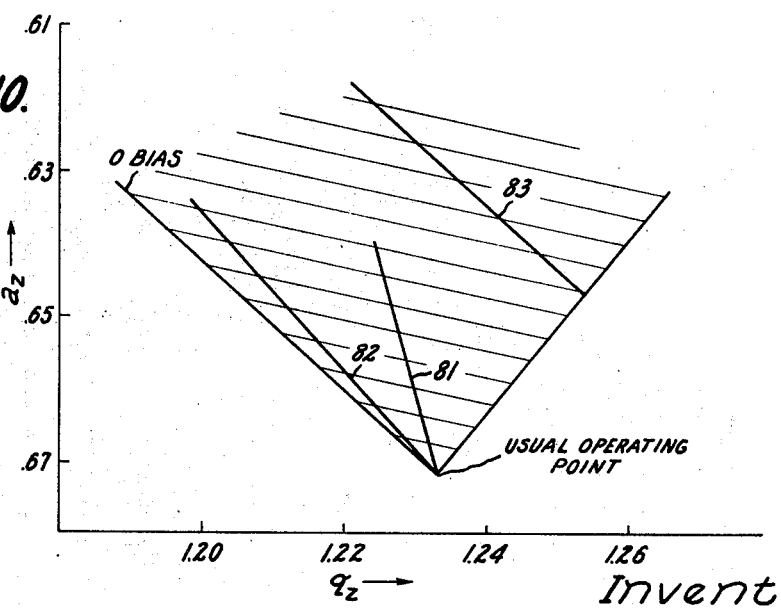
FIG. 10 is a diagram illustrating operational characteristics of the apparatus of FIG. 9.
Figure 11:
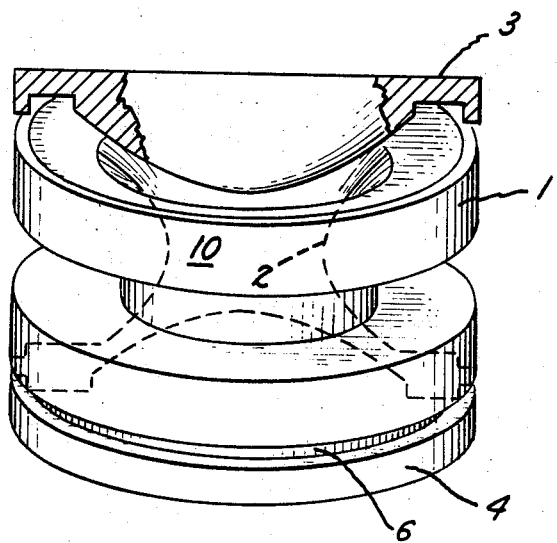
FIG. 11 is a perspective view of the mass spectrometer of the apparatus of FIG. 1 rotated through 90° illustrating the ring electrode thereof.

The effect of the variable voltage between the endcaps provided by the apparatus of FIG. 9 is illustrated by the curve of FIG. 10. We have observed that nonlinear resonances cause ions to follow unstable trajectories under conditions when they normally would be contained. The region of FIG. 10 shows that portion of the $(a, q)$ diagram, which is one of normally stable operation. The $\beta_z=0$, $\beta_r=1$ tip is used for mass selectivity storage. The nonlinear resonances mentioned occur as lines of instability 81, 82 on FIG. 10. These lines pass through the $\beta_z=0$, $\beta_r=1$ point and interfere with normal operations. The effect of the bias voltage between electrodes 3, 4 is to shift the operating point to a different portion of the $(a, q)$ diagram where nonlinear resonances do not occur. A voltage with a magnitude of a few percentages of that between the ring electrode 1 and the cap electrodes 3, 4 is usually sufficient. The effect of this voltage is to move the operating point to a lower $a/q$ scan line and to higher $q$ values, i.e., to the position shown by line 83 in FIG. 10. However, the bias voltage does not correspondingly shift the nonlinear resonances 81, 82. The shift in operating point also results in transformation of poor peak shapes in the mass spectrum with resonance dips in them to excellent flat-topped shapes.

While there have been shown and described several embodiments of the present invention, other modifications may occur to those skilled in the art. It is intended, therefore, by the appended claims to cover all such modifications as fall within the true spirit and scope of this invention.

What we claim as new and desire to secure by Letters Patent of the United States is:

1. Apparatus for separating and measuring the concentration of ions having different masses according to their masses comprising:
    a plurality of rotationally symmetrical electrodes defining a containment region and comprising a pair of opposed end electrodes and a ring electrode positioned between the end electrodes;
    means providing ions to be measured in said region;
    means supplying both unidirectional and time varying electrical potentials to said electrodes to establish a time varying rotationally symmetric three-dimensional electric field in said containment region, said unidirectional potential being connected between said end electrodes and said ring electrode and said time varying potential being applied to said ring electrode;
    means for controlling said electrical potential and the strength and configuration of the electric field to prevent ions of a selected mass-to-charge ratio from reaching said electrodes while permitting all ions of unselected mass-to-charge ratio to reach said electrodes thereby to store in said region only ions of said selected mass-to-charge ratio, one of said electrodes having an aperture;
    means applying a voltage pulse to said one electrode whereby ions stored in said region are passed through said aperture, and
    means external to said region for receiving and measuring the ions passing through said aperture.

2. The apparatus of claim 1 in which said electrodes are hyperboloids of revolution, a first of said electrodes is ring-shaped, additional electrodes are positioned along the axis of the ring electrode and said one electrode is one of said additional electrodes.

3. The apparatus of claim 1 in which at least one of said electrodes comprises a wire mesh.

4. The apparatus of claim 3 in which electrons are introduced into the region through an opening in said ring electrode to ionize gas in said region.

5. The apparatus of claim 3 in which the aperture comprises a mesh of holes sufficiently small that they do not distort the electrical field in said region.

6. The apparatus of claim 3 in which the ion measuring means includes an electron multiplier and means to convert the pulse output signal to a continuous signal.

7. The apparatus of claim 3 in which the unidirectional component of potential is variable and connected between said ring electrode and one of said additional electrodes and a unidirectional bias voltage is connected between said additional electrodes, said bias voltage being a predetermined percentage of said variable unidirectional potential.

8. The apparatus of claim 3 which has an evacuated body connected thereto, means to apply a probe gas to said body, the potentials applied to said electrodes having a value such that ions of such probe gas are contained in said region, and means for indicating the detection of probe gas ions by said apparatus.

9. The apparatus of claim 3 in which the other additional electrode has an aperture, a negative voltage pulse is applied to said one additional electrode, a positive voltage pulse is applied to the other additional electrode, and which includes means external to said region to measure negative ions swept from said region by such positive pulse.

10. The apparatus of claim 9 in which ions are introduced to said containment region through one of said additional electrodes from an ion source located outside said region.

11. The apparatus of claim 9 in which ions are introduced into said region through a snout which extends into the region.

12. Apparatus for measuring the total residual gas pressure of an evacuated enclosure comprising:
  a plurality of opposed electrodes defining a containment region connected to said evacuated enclosure so that residual gas molecules in said enclosure enter said region, said electrodes being hyperboloids of revolution, and comprising a ring-shaped electrode and two other electrodes positioned along the axis of the ring electrode;
  means for ionizing gas molecules in said region;
  means maintaining a fixed potential between said ring electrode and said other electrodes;
  means applying a time-varying potential to said ring electrode for establishing a symmetric, three-dimensional time varying field in said region of a strength such that ions having a wide range of values of mass-to-charge are trapped by such field and prevented from reaching said electrodes whereby ions are stored in said region;
  one of said other electrodes having an aperture therein, a collecting electrode positioned adjacent said aperture at a point external to said region;
  means periodically supplying a voltage pulse to said one electrode for sweeping ions from said region to said collecting electrode, and
  measuring means connected to said collecting electrode.

13. A method of separating and measuring ions having different mass-to-charge ratios which comprises admitting ions to a confined region, establishing a rotationally symmetric, three-dimensional, time-varying field in the region, controlling the electric field to sort the ions dynamically controlling the electric field to cause ions of a desired mass to resonate and oscillate so that such ions are collected and trapped in the field and prevented from exiting therefrom while ions of different mass leave and are removed from the field, storing trapped ions in the region for desired periods of time, and after each period of time applying an electric pulse to the field to remove the trapped ions to a point outside the region for measurement purposes.

14. The method of claim 13 which includes varying the periodicity and strength of the time-varying field to trap ions of differing mass-to-charge ratios and removing and measuring the ions trapped with each particular field strength.

References Cited
UNITED STATES PATENTS

| | | | |
|---|---|---|---|
| 2,764,691 | 9/1956 | Hipple | 250—41.9 |
| 2,939,952 | 6/1960 | Paul et al. | 250—41.9 |
| 2,957,985 | 10/1960 | Brubaker | 250—41.9 |
| 3,247,373 | 4/1966 | Herzog et al. | 250—41.9 |
| 3,307,033 | 2/1967 | Vestal | 250—41.9 |

WILLIAM F. LINDQUIST, Primary Examiner

U.S. Cl. X.R.

324—33